Figure 1:
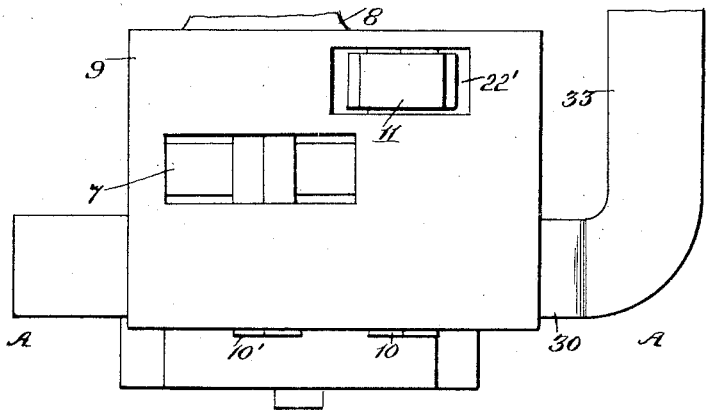

H. M. B. BARY.
WEIGHING SCALE.
APPLICATION FILED MAR. 1, 1911.

1,023,495.

Patented Apr. 16, 1912.

2 SHEETS—SHEET 1.

Witnesses
Iva P. Himes.
L. Cloud Newman.

Inventor
H. M. B. Bary
By Connell Bros
Attorneys

H. M. B. BARY.
WEIGHING SCALE.
APPLICATION FILED MAR. 1, 1911.

1,023,495.

Patented Apr. 16, 1912.
2 SHEETS—SHEET 2.

UNITED STATES PATENT OFFICE.

HENRY M. B. BARY, OF PHILADELPHIA, PENNSYLVANIA.

WEIGHING-SCALE.

1,023,495.  Specification of Letters Patent.  Patented Apr. 16, 1912.

Application filed March 1, 1911. Serial No. 611,574.

*To all whom it may concern:*

Be it known that I, HENRY M. B. BARY, a citizen of the United States, residing at Philadelphia, in the county of Philadelphia and State of Pennsylvania, have invented certain new and useful Improvements in Weighing-Scales, of which the following is a specification, reference being had therein to the accompanying drawing.

My invention has relation to weighing scales and relates in particular to large platform weighing scales having provision for relieving the knife edges and other delicate parts of the weighing mechanism from the weight of the platform whether loaded or unloaded and from shocks, jars or jolts that would be imposed on the delicate parts of the weighing mechanism by moving the load on or off the platform.

In the class of weighing scales to which my present invention is to be applied the weighing mechanism is positively removed at all times except when the weighing operation is to be performed, from contact with the platform, the platform being, meanwhile, supported on independent supports, and this removal of the weighing mechanism out of contact with the platform being accomplished by an abnormal movement of the weighing levers.

My present invention has for its object the provision of means for the prevention of unnecessary wear of the knife edges and bearings of the weighing levers which will avoid unnecessary wear of the knife edges and bearings, not only when the weighing mechanism of the scale is out of commission or inactive, but also during the period of bringing it out of and into commission and when at rest when out of commission.

In connection with means for abnormally moving the weighing levers, I provide novel means in my present invention for obviating the excessive wear imposed on the knife edges and knife edge bearings by the abnormal movement of the weighing levers, such means comprising double fulcrum points for the weighing levers, one being the regular knife edge fulcrum ordinarily employed, which is utilized during the weighing operation, the other a supplementary and vertically adjustable fulcrum device which is brought into service when the abnormal movement of the weighing levers is being performed, this supplementary fulcrum device being so constructed and arranged that it will restore the knife edges, employed as fulcrums during the actual weighing operation, to their seats at the precise time when the weighing levers reach an exactly horizontal position which, as is well known, is the correct position for weighing.

My invention consists in the novel construction, combination and arrangement of parts hereinafter described.

Figure 2:
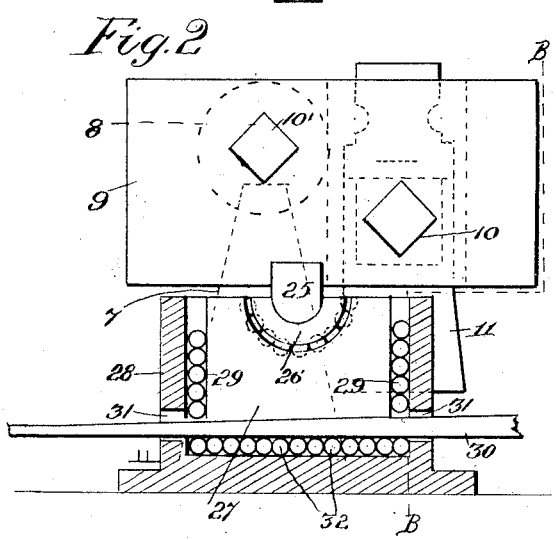
Figure 3:
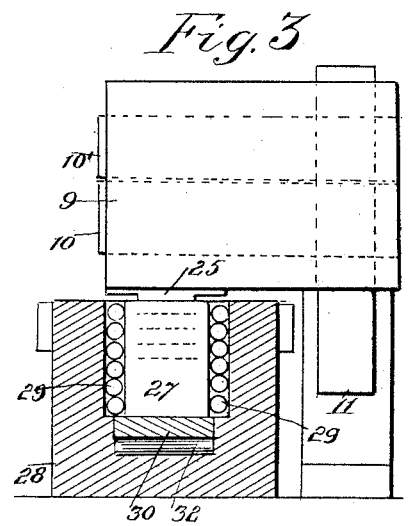
Figure 4:
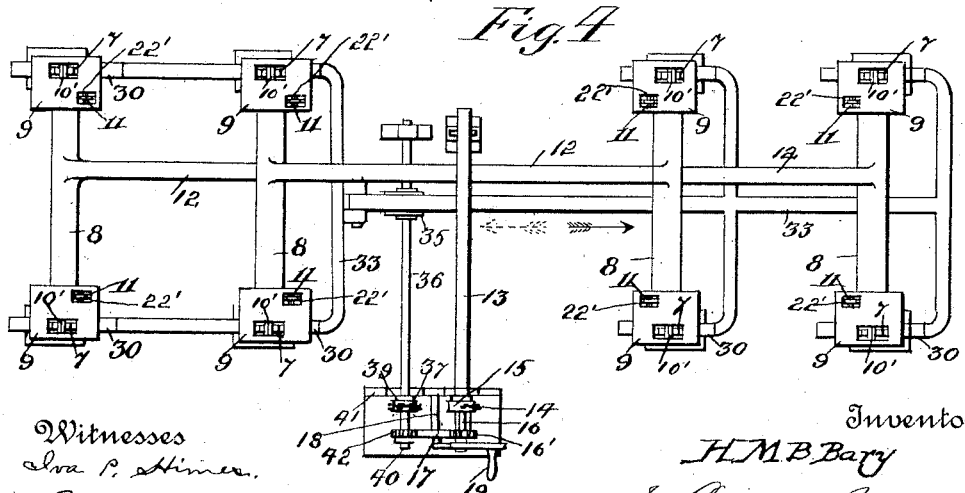
Figure 5:
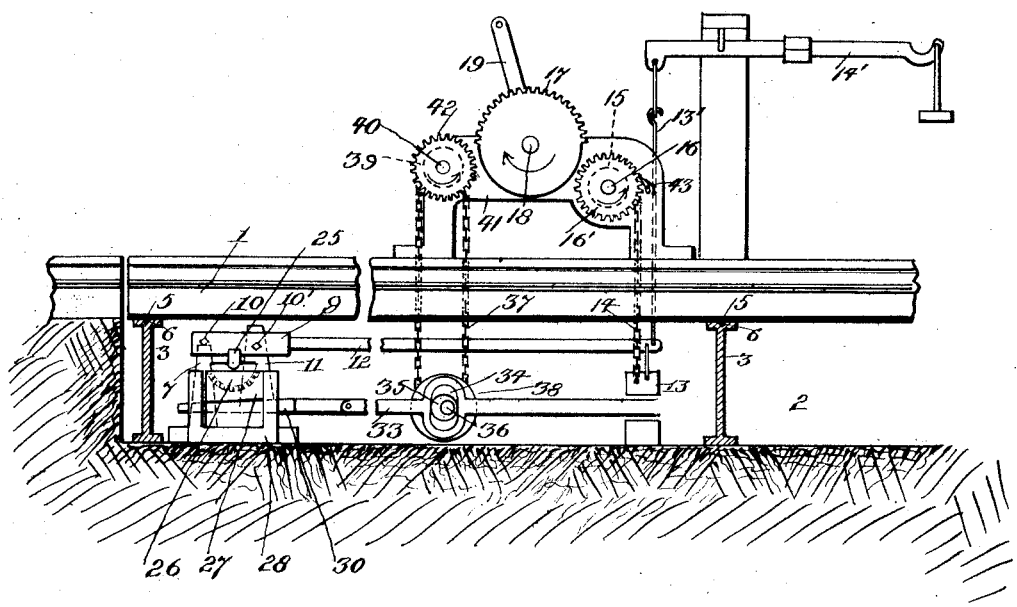

My invention is illustrated in the accompanying drawings wherein:

Figure 1 is a plan view of a part of a weighing scale constructed according to my invention. Fig. 2, is a partly vertical sectional view of the part of a scale shown in Fig. 1, on the line A, A, of said Fig. 1. Fig. 3, is a transverse vertical sectional view on the line B, B, of Fig. 2. Fig. 4 is a diagram of the weighing mechanism below the platform. Fig. 5 is a view in elevation of the mechanism for operating the devices shown in Figs. 1, 2, 3 and 4.

The platform 1 is constructed in the usual manner and seats at all times, except when the weighing operation is being actually performed upon the I beams 3, 3, which afford a support therefor independent of the weighing levers, the accurate seating of the platform on the I beams being insured and accidental movement or displacement of the platform when seated being prevented by wedge shaped ribs 5, on the bottom of the platform and correspondingly shaped longitudinal grooves 6, on the upper surfaces of the I beams.

That portion of the weighing mechanism which is located below the platform and in the pit 2, with the exception of certain features which will be particularly pointed out, is of an ordinary character, being composed of the usual number of levers, with their fulcrum blocks or supports, knife edges, etc., the fulcrum blocks being designated 7, and supporting the rock shafts 8, which carry the main levers 9, provided with knife edges 10, upon which are mounted pendulous contact blocks 11, weighted as shown, so as to preserve a vertical position, these contact blocks being located so as to bear against the lower surface of the platform when the weighing mechanism is raised to elevate the platform in the manner hereinafter described. The rock shafts 8 carry, in addition to the main levers 9, the levers 12 which are connected to the extension lever 13 that extends laterally into a lateral extension of the pit adjacent to which is located the scale beam, its supports and appurtenances. The levers 12, 13 are provided with the usual knife edges and bearings and other appurtenant parts of the ordinary weighing scale and these parts being very well known need not be herein described. The extension lever 13 is capable of being moved up and down at its free end, a sufficient distance to produce the required abnormal movement of the other levers of the weighing mechanism, this movement being produced by means of a flexible connection 14, leading to a drum 15, mounted on a shaft 16 and rotated by a pinion 16', which is in turn rotated by a mutilated gear wheel 17, mounted on a shaft 18, which is turned by a crank handle 19. The extension lever is also connected by a rod 13', to scale beam 14' this rod being adapted to be hooked and unhooked from the scale beam at pleasure. The extension lever 13 is connected to the center levers 12 and the latter are carried by rock shafts 8 which also carry the main levers 9, which are fulcrumed on bearings 7 by knife edges 10'.

So far as above described, the construction of the weighing levers is of the usual character and I will now describe my improvements as applied thereto.

The main levers 9, are formed with cavities 22' in which are arranged pendulous contact blocks 11', supported on knife edges 10. Upon the bottoms of the main levers 9 are fixed fulcrum blocks 25 having, preferably, rounded lower ends, these fulcrum blocks seating at certain times in rocking cradles 26, which are seated in vertically movable supports 27, that are arranged in bases 28, friction rollers 29 being arranged at the sides and ends of supports 27, to facilitate easy movement. Wedges 30 are arranged to slide through slots 31, in the bases 28, under supports 27, the supports resting on these wedges. Friction rollers 32 are arranged under the wedges to facilitate their easy movement and the wedges of the whole system are carried by a horizontally movable frame 33, which has a vertical slot 34, to receive an eccentric 35, fixed on a shaft 36. Motion is communicated to shaft 36, by a chain 37 running over a pulley 38 on shaft 36, and over a pulley 39 carried by a shaft 40 mounted in a frame 41, in which is also mounted the shaft 16. The shaft 40, carries a pinion 42 that meshes with the mutilated gear wheel 17 and a dog 43, engages pinion 16', this dog preventing accidental reverse movement of the pinion when it is out of engagement with the teeth of the mutilated gear wheel.

Operation: The parts being constructed as above described, operate in the following manner: At the position of parts shown in Fig. 2, the knife edges of the main levers are in contact with their bearings and the pendulous contact blocks are in contact with the platform and have raised the latter off its independent supports 45, and the main levers being now in a perfectly horizontal position, are sustaining the platform and its load and said main levers are supported at two points i. e., on the knife edges 10 and on the vertically movable supports 27, the cradles 26, of which are now in contact with the fulcrum blocks 25, carried by the main levers. If, now the handle 19 is turned the mutilated gear wheel will engage the pinion 42 and turn shaft 40, pulley 39, pulley 38, shaft 36, and eccentric 35. The rotation of eccentric 35 will move the frame 33 horizontally and draw all the wedges connected thereto, in the direction of the arrow A, in Fig. 4, and this will effect the simultaneous lowering of all the supports 27, with their cradles 26, and thus leave the main levers with the full weight of the platform and load imposed on them resting solely on their knife edge bearings while still in an exactly horizontal position. The extension lever is now connected to the scale beam 14', by the rod 13', which has meanwhile been disconnected with the scale beam and the flexible connection 14 is relaxed by raising dog 43, from pinion 16', thus imposing the downward pull of the extension lever on the scale beam which is brought to balanced position by moving the poise along the same in the usual manner. After the weight has been ascertained the mutilated gear wheel is turned in a reverse direction to its first described movement and first turns the pinion 42, thereby through the connections already described turning the eccentric 35, and moving the frame 33, in the direction of the dotted arrow in Fig. 4, thus pushing the wedges back under the supports 27, and raising the supports until their cradles 26, come into contact with the fulcrum blocks 25. The main lever is now again supported on two points i. e. the knife edges 10' and the fulcrum blocks 25, and is in exact horizontal position. The continuation of the motion of the mutilated gear wheel causes it to engage pinion 16' and the rod 13' being now disconnected from the scale beam, the extension lever is allowed to descend and the main levers also descend at the end carrying the pendulous contact blocks, but ascend at the end carrying their knife edges 10' turning now on the cradles 26, as their fulcrum points and lift the knife edges out of contact with their bearings 22. The pendulous contact blocks 23' are, by this movement, taken out of contact with the platform and the platform allowed to rest upon its independent supports, and cars, wagons or other loads may be moved on, off or over the platform without danger to any of the delicate parts of the weighing mechanism. To restore the parts to weighing position the mutilated gear wheel is turned again in the direction of the arrow and the extension lever is raised thus turning the main levers with the cradles 26 as their fulcrum until the knife edges 23 meet their bearings 22, which is just when the main levers reach a horizontal position, the operation then proceeding as hereinbefore described.

It will be observed that the knife edges of the main levers are brought gently to rest on their bearings at always the same exact point and always only when the main levers are in an exactly horizontal position, and that the weight of the platform and load is only imposed on the knife edges of the main levers while the actual weighing operation is being performed, hence the rocking movement of the knife edges on their bearings is but very slight and unnecessary wear is avoided. Furthermore the knife edges being lifted clear of their bearings when the scale is inactive, the knife edges and bearings are easily accessible for cleaning in any desired manner.

I claim:

1. In weighing scales, the combination with weighing levers having knife edge fulcrum members and with bearings therefor of supplementary fulcrum members and supports therefor and means for bringing the supports for the supplementary fulcrum members in and out of operative position relatively to the supplementary fulcrum members while the said knife edge bearings remain stationary.

2. In weighing scales, the combination with weighing levers having knife-edge fulcrum members and with stationary bearings therefor and a platform, of supplementary fulcrum members and supports therefor located between said knife edges and the points of contact of the levers with the platform and means for alternately imposing the weighing levers on their knife edges and on the supplementary bearings.

3. In weighing scales, the combination with weighing levers having knife edge fulcrum members and with stationary bearings for said fulcrum members, of supplementary fulcrum members, adjustable supports for said supplementary fulcrum members and means for adjusting said adjustable supports.

4. In a weighing scales, the combination of weighing levers, a platform, pendulous contact blocks carried by the weighing levers and adapted to contact with said platform, main fulcrum members carried by the weighing levers, stationary bearings for said main fulcrum members, supplementary fulcrum members carried by the weighing levers between the said main fulcrum members and said contact blocks, movable supports for said supplementary fulcrum members and means for moving said supports into and out of operative position relatively to the supplementary fulcrum members.

5. In weighing scales, the combination of weighing levers, fulcrum members carried thereby, stationary bearings for said fulcrum members, supplementary fulcrum members also carried by the weighing levers, vertically movable supports for said supplementary fulcrum members wedges adapted to be moved under said supports to raise and lower the same, and means for moving said wedges.

6. In weighing scales, the combination with weighing levers fulcrumed on bearings, of supplementary fulcrum members carried by said levers, adjustable supports for said supplementary fulcrum members, rocking cradles carried by the said supports and adapted to receive said supplementary fulcrum members, and means for adjusting said supports.

In testimony whereof I affix my signature in presence of two witnesses.

HENRY M. B. BARY.

Witnesses:
 THOS. A. CONNOLLY,
 BENNETT S. JONES.